(12) United States Patent
Burkhart et al.

(10) Patent No.: US 11,575,320 B2
(45) Date of Patent: Feb. 7, 2023

(54) CURRENT-CONTROLLED, SINGLE-INDUCTOR, MULTIPLE-OUTPUT, DC-DC CONVERTER WITH CONTINUOUS CONDUCTION AND DISCONTINUOUS CONDUCTION MODES

(71) Applicant: Maxim Integrated Products, Inc., San Jose, CA (US)

(72) Inventors: Justin Michael Burkhart, Bolton, MA (US); Matthew Straayer, Acton, MA (US)

(73) Assignee: MAXIM INTEGRATED PRODUCTS, INC., San Jose, CA (US)

( * ) Notice: Subject to any disclaimer, the term of this patent is extended or adjusted under 35 U.S.C. 154(b) by 52 days.

(21) Appl. No.: 17/348,639

(22) Filed: Jun. 15, 2021

(65) Prior Publication Data
US 2021/0391792 A1 Dec. 16, 2021

Related U.S. Application Data

(60) Provisional application No. 63/039,401, filed on Jun. 15, 2020.

(51) Int. Cl.
*H02M 3/158* (2006.01)
*H02M 1/00* (2006.01)
*H02M 1/14* (2006.01)
*H02M 3/156* (2006.01)
*H02M 1/088* (2006.01)

(52) U.S. Cl.
CPC ........... *H02M 3/158* (2013.01); *H02M 1/009* (2021.05); *H02M 1/14* (2013.01); *H02M 1/088* (2013.01); *H02M 3/156* (2013.01)

(58) Field of Classification Search
None
See application file for complete search history.

(56) References Cited

U.S. PATENT DOCUMENTS

| | | | |
|---|---|---|---|
| 9,099,919 B2 * | 8/2015 | Jing | H02M 3/158 |
| 10,622,900 B1 * | 4/2020 | Wei | H02M 3/1584 |
| 11,329,557 B2 * | 5/2022 | Jung | H02M 3/1584 |

(Continued)

FOREIGN PATENT DOCUMENTS

JP 2013223286 * 10/2013 ............ H02M 3/158

*Primary Examiner* — Matthew V Nguyen
(74) *Attorney, Agent, or Firm* — Lathrop GPM LLP

(57) ABSTRACT

A controller for a SIMO DC-DC converter operable in CCM and DCM receives a signal representative of an inductor current, and signals representative of a first and a second DC-DC converter output. The controller has a first and second output adapted to control electronic switches coupled to a first and second output filter, and a third and fourth output adapted to control current in an inductor. The controller controls the outputs based upon the inputs by determining a desired PWL inductor current and current waveform, and determines pulsewidths of the outputs, to match the inductor current to the desired PWL. A timer controls pulsewidths of the outputs and the controller dynamically selects DCM or CCM to maintain the first and second DC-DC converter outputs at predetermined levels. In embodiments, the desired PWL inductor current is one or both of a desired valley current and a desired peak current.

13 Claims, 7 Drawing Sheets

(56) References Cited

U.S. PATENT DOCUMENTS

| | | | |
|---|---|---|---|
| 2008/0231115 A1* | 9/2008 | Cho | H02M 3/33561 |
| | | | 307/41 |
| 2015/0008742 A1* | 1/2015 | Huang | H02M 3/158 |
| | | | 307/31 |
| 2018/0337602 A1* | 11/2018 | Zhou | H02M 1/36 |
| 2020/0328677 A1* | 10/2020 | Amin | H02M 3/1582 |

* cited by examiner

CURRENT-CONTROLLED, SINGLE-INDUCTOR, MULTIPLE-OUTPUT, DC-DC CONVERTER WITH CONTINUOUS CONDUCTION AND DISCONTINUOUS CONDUCTION MODES

CROSS-REFERENCE TO RELATED APPLICATIONS

This application claims benefit of priority to U.S. Provisional Patent Application Ser. No. 63/039,401, filed Jun. 15, 2020, which is incorporated herein by reference in its entirety.

BACKGROUND

Single-Inductor-Multiple-Output (SIMO) converters use one inductor to regulate multiple output voltages by time sharing the inductor, this is done by time-sharing the inductor among the multiple outputs in an operating cycle. Typical SIMO converters on the market operate only in discontinuous conduction mode (DCM) where the inductor current reaches zero during each cycle. Such DCM converters are unable to fully utilize the inductor saturation current rating because discontinuous mode typically can at most deliver Isat/2. Furthermore, operation at the limit of Isat/2 is typically inefficient due to the large inductor current ripple. Increasing the maximum load current capability requires both increasing the peak current and decreasing the pulse-width to maintain constant output voltage ripple (without increasing output capacitance).

SUMMARY

A controller for a SIMO DC-DC converter operable in CCM and discontinuous conduction mode DCM receives a signal representative of an inductor current, signals representative of a first and a second DC-DC converter output. The controller has a first and second output adapted to control electronic switches coupled to a first and second output filter, and a third and fourth output adapted to control current in an inductor. The controller controls the outputs based upon the inputs by determining a desired PWL inductor current waveform, and determines pulsewidths of the outputs, to match the inductor current to the desired PWL waveform. Predetermined time intervals or a timer control pulsewidths of the outputs and the controller dynamically selects DCM or CCM to maintain the first and second DC-DC converter outputs at predetermined levels. In embodiments, the desired PWL inductor current waveform is one or both of a desired valley current and a desired peak current. The SIMO DC-DC converter operates in CCM when heavily loaded, and DCM when lightly loaded. In each case the inductor is time shared between the inputs and outputs as well as ground.

DETAILED DESCRIPTION OF THE EMBODIMENTS

Figure 1:
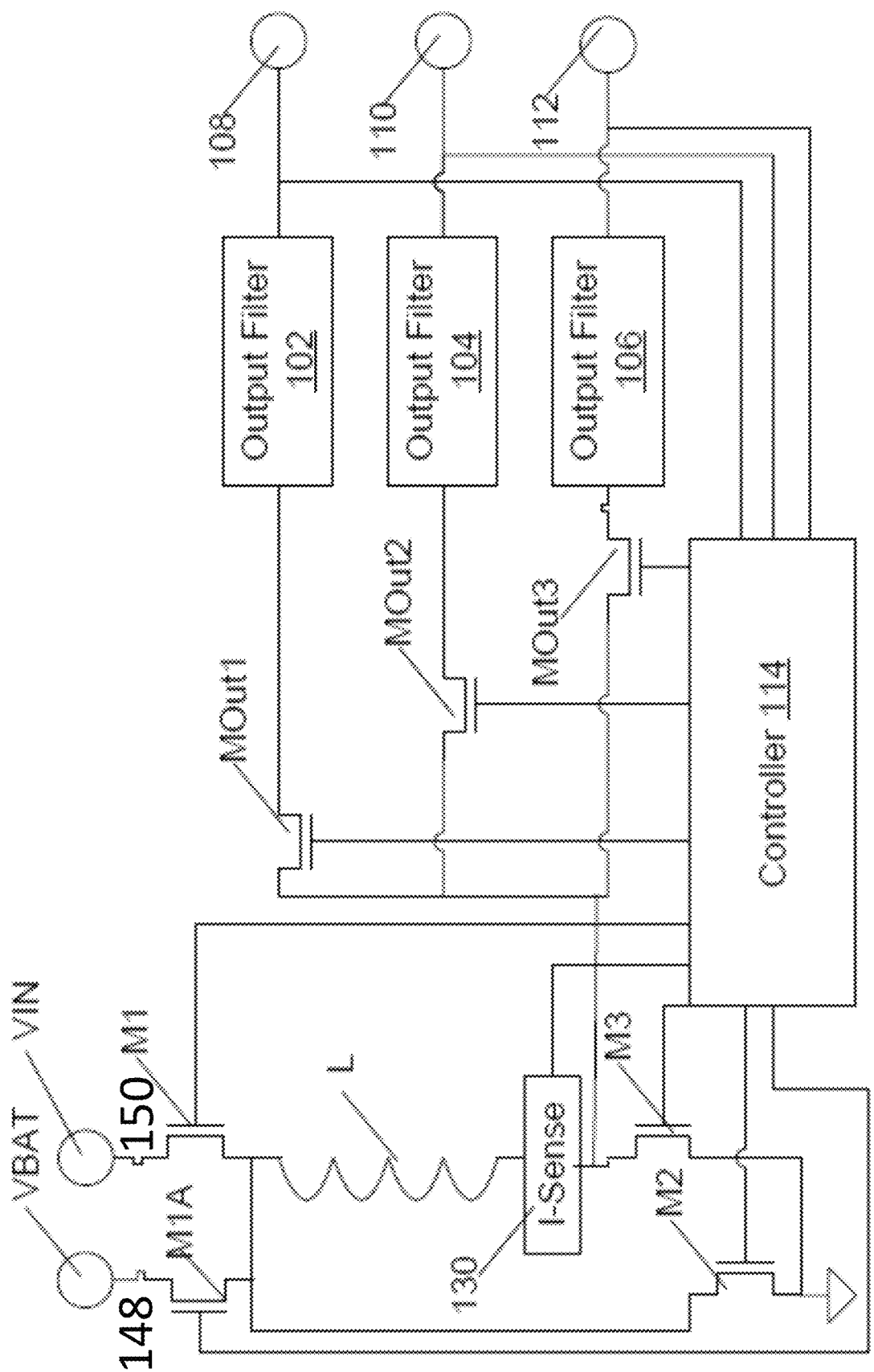
FIG. 1 is a schematic diagram of a SIMO converter having 3 outputs and capable of operation in buck, buck-boost, and boost modes.

We describe a SIMO converter and controller for SIMO converters which operates in both Continuous Conduction Mode (CCM), where inductor current does not reach zero each cycle, and Discontinuous Conduction Mode (DCM) where inductor current reaches zero for a portion of each cycle. The converter automatically determines whether it should operate in DCM or CCM according to output voltages, generally operating in CCM at heavy load conditions and DCM at light load conditions. It addresses the cross-regulation and transient response with load currents that may or may not be unbalanced, and maximizes use of the inductor energy storage capability. As a result, by time sharing the inductor, the converter can support a higher current level for a given inductor saturation current rating and operates with higher efficiency than typical DCM SIMO converters.

A SIMO converter has a first 102, a second 104, and a third 106 output filter coupled to first 108, second 110, and third 112 outputs of the converter. In embodiments, the output filters 102, 104, 106 each include at least one energy storage capacitor. A first electronic switch M1 is coupled to an input of the DC-DC converter and thence drives an inductor L, this switch is typically pulsed during buck modes. The inductor drives a second electronic switch MOut1, and a third electronic switch MOut2, the second electronic switch MOut1 is coupled to the first output filter 102, and the third electronic switch MOut2 is coupled to the second output filter 104. The inductor is also coupled to drive a sixth electronic switch MOut3 coupled to the third output filter 106; the second, third, and sixth electronic switch are output electronic switches. In embodiments, the sixth switch and third output filter may be deleted, or additional pairs of output electronic switch and output filter may be added.

The SIMO converter also may have one or both of fourth M2 and fifth M3 electronic switches coupled to the inductor L, or in some embodiments the fifth electronic switch M3 may be replaced with a low-threshold diode. The converter also has a controller 114 coupled to monitor voltage at least one, and in many embodiments, all, outputs 108, 110, 112, a signal representative of current in the inductor L that may be an output of a current-sensing device 130. The controller is configured to control the electronic switches.

In this example, the inductor current can be increased by closing switches M1 and M2 or by closing switches M1 and one of the output electronic switches MOut1, MOut2, MOut3 if the associated output VOUT0 108, VOUT1 110, VOUT2 112 has voltage less than a converter input VIN voltage. The inductor current can be decreased by closing switches M3 and one of the output electronic switches MOut1, MOut2, MOut3 or by closing switches M1 and one of the output switches MOut1, MOut2, MOut3 if the associated output 108, 110, 112 has voltage VOUT(N) greater than converter input VIN voltage.

The new controller for SIMO converters enables operation in both continuous conduction mode (CCM) and discontinuous conduction mode (DCM). CCM controllers can be classified into two types of controllers: voltage-mode and current-mode. Voltage-mode controllers typically feed an output voltage back to the controller and use a high-order compensator to overcome the double-pole in the power-stage to operate with stability margin. Current-mode controllers typically utilize feedback of both inductor current and output voltage and have both inner current-loop control and an outer voltage-loop control. The benefit of this latter approach is that each loop is only tasked with stabilizing a first-order system. Current-mode controllers are suitable for SIMO converters because they can be configured with a single inner current loop and multiple outer voltage loops (one for each output).

Figure 2:
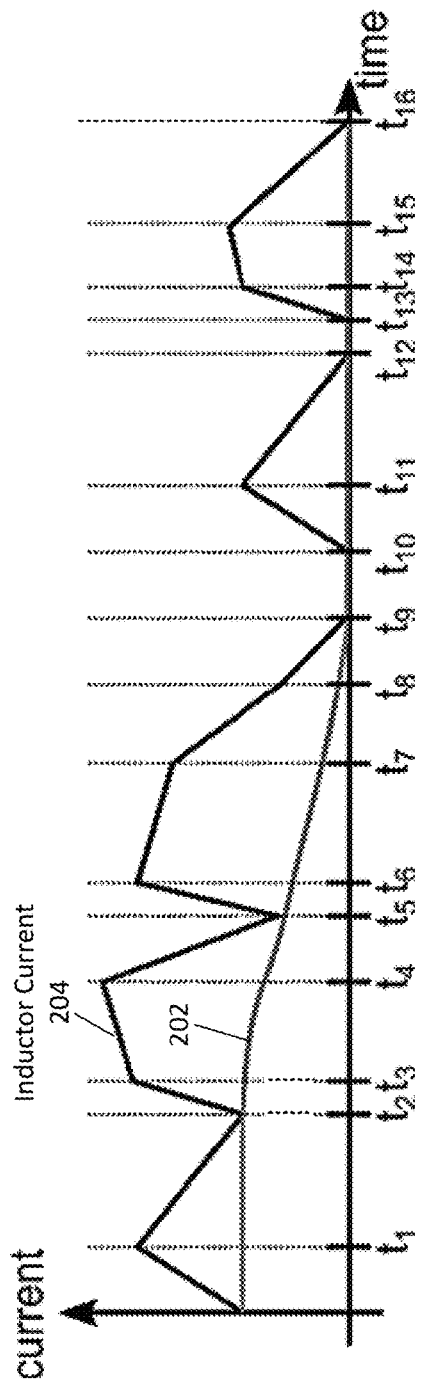
FIG. 2 is a waveform diagram indicating use of a valley current target to control switching of the SIMO converter.
Figure 3:
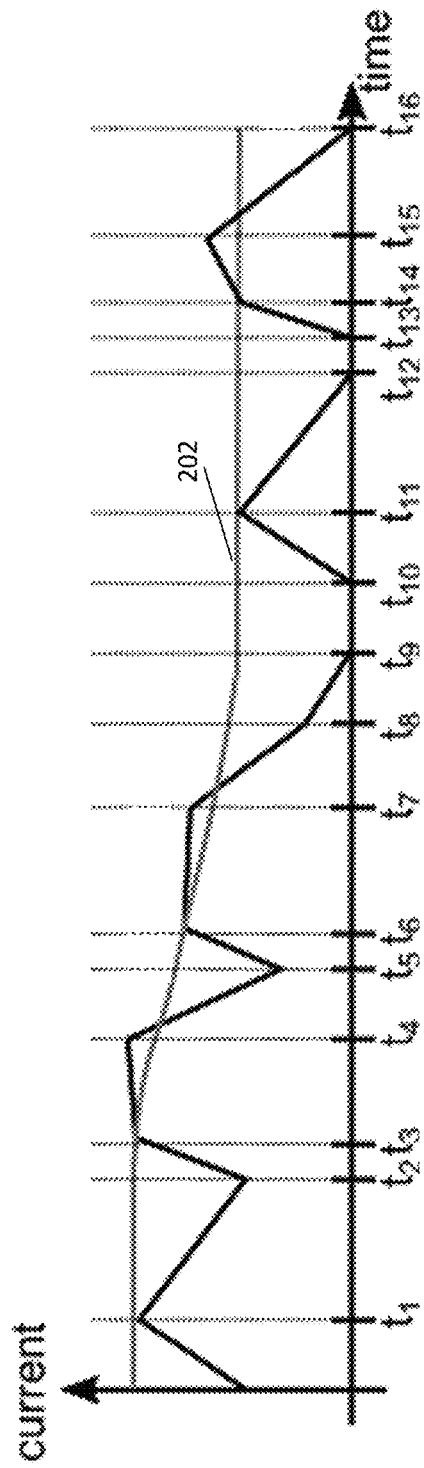
FIG. 3 is a waveform diagram indicating use of a peak current target to control switching of the SIMO converter.
Figure 4:
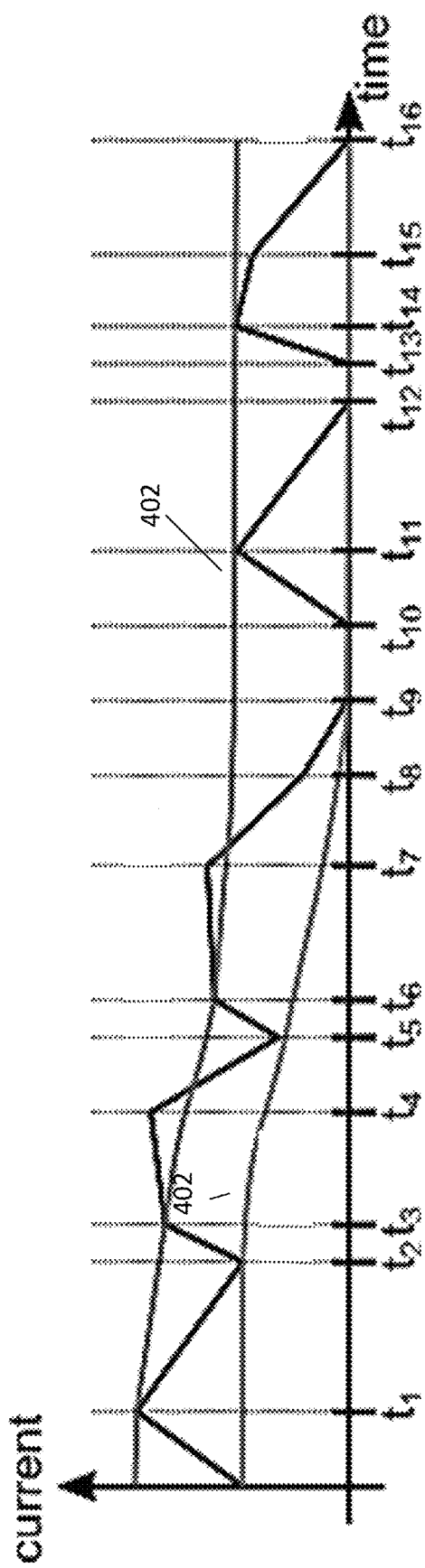
FIG. 4 is a waveform diagram indicating use of both a valley current target and a peak current target to control switching of the SIMO converter.

The current-mode controller operates in continuous conduction mode (CCM) by determining inductor current target(s) with a local minimum that inductor current target is non-zero (implying CCM operation) for at least one condition of the SIMO DC-DC converter; when a local minimum of inductor current targets becomes zero the converter effectively operates in discontinuous conduction mode (DCM). The inductor slope of the inductor current is determined by the voltage applied to the inductor and is hence determined by the converter switch network configuration. Because DC-DC converters are typically operated at a switching frequency much greater than the resonant frequency of the inductor and the output filter capacitors, we can approximate the slope of the current as constant in each converter switch network configuration. Hence, the controller determining a sequence of converter switch configurations is equivalent to the controller determining a sequence of desired piecewise-linear (PWL) segments for a desired inductor current waveform. Each PWL segment is terminated upon a timer expiring or at the threshold crossing of a signal that represents inductor current. The power stage configuration, including the input switch M1, inductor-ground switches M2, M3, and output electronic switches MOut1, MOut2, MOut3, can be changed for each PWL current segment. The power stage effectively cyclically couples a first terminal 148 of the inductor through switch M1 or M1A of the electronic switch network to a power supply or through switch M2 to ground for each piecewise linear current segment. The power stage also effectively cyclically couples a second terminal 150 of the inductor through a selected output switch of the electronic switch network MOut1, MOut2, or MOut3 to an output filter 102, 102, or 103, or to ground through switch M3, for each piecewise linear inductor current segment. The desired piecewise-linear inductor-current 204 segments are selected to track an inductor current target. To track the inductor current target, the piecewise-linear inductor-current 204 segments are arranged in a sequence that first causes the inductor current to ramp away from the inductor current target, then to return to the inductor current target. Each time the inductor current returns to the inductor current target completes a cycle. The inductor current target may be a valley target 202 current as shown in FIG. 2. In alternative embodiments, the desired piecewise-linear inductor-current segments may track peak target currents as illustrated in FIG. 3, or both peak and valley target currents as illustrated in FIG. 4.

Peak and Valley Current Control

FIG. 2 demonstrates an example of valley current control. The controller uses timers to determine the time duration of PWL current segments that increase the inductor current and PWL current segments that have a small magnitude of current slope. The time duration of PWL current segments that decrease the inductor current are determined by comparing the inductor current to a threshold, named "valley target" in the figure. In FIG. 2, the converter is operating in CCM until $t_9$. After $t_9$, the converter is operating in DCM. In CCM, when the current decreases to the valley target, the controller immediately goes into a state that increases the inductor current. When in DCM, the valley target is zero, and when the current decreases to zero, the controller can configure the power stage to hold the current at zero and is not required to immediately increase the inductor current. In this example:

From time=0 to time=$t_1$, the power stage is configured to increase the inductor current by closing switch M1 and one of M3, or one of the MOut(N) switches if VOut(N) is <Vin. This PWL current segment is terminated by the expiration of a timer.

From time=$t_1$ to time=$t_2$, the power stage is configured to decrease the inductor current by closing switch one of the MOut(N) switches, and either M1 if VOut(N)>Vin or M2. This PWL current segment is terminated when the inductor current decreases to cross the valley target.

From time=$t_2$ to time=$t_3$, the power stage is configured to increase the inductor current by closing switch M1 and one of M3, or one of the MOut(N) switches if VOut(N) is <Vin. This PWL current segment is terminated by the expiration of a timer.

From time=$t_3$ to time=$t_4$, the power stage is configured to configuration where the magnitude of the inductor current slope is small closing switch M1 and of the MOut(N) switches where VOut(N) is close to the value of Vin. This PWL current segment is terminated by the expiration of a timer.

From time=$t_4$ to time=$t_5$, the power stage is configured to decrease the inductor current by closing switch one of the Mout(N) switches, and either M1 if VOut(N)>Vin or M2. This PWL current segment is terminated when the inductor current decreases to cross the valley target.

From time=$t_5$ to time=$t_6$, the power stage is configured to increase the inductor current by closing switch M1 and one of M3, or one of the MOut(N) switches if VOut(N) is <Vin. This PWL current segment is terminated by the expiration of a timer.

From time=$t_6$ to time=$t_7$, the power stage is configured to configuration where the magnitude of the inductor current slope is small closing switch M1 and of the MOut(N) switches where VOut(N) close to the value of Vin. This PWL current segment is terminated by the expiration of a timer.

From time=$t_7$ to time=$t_8$, the power stage is configured to decrease the inductor current by closing switch one of the MOut(N) switches, and either M1 if VOut(N)>Vin or M2. This PWL current segment is terminated prior to reaching the valley current target, and as a result the controller moves to another PWL segment that decreases the inductor current until the valley target is reached. This represents a scenario where the controller decided to switch to a different output.

From time=$t_8$ to time=$t_9$, the power stage is configured to decrease the inductor current by closing switch one of the MOut(N) switches, and either M1 if VOut(N)>Vin or M2. This PWL current segment is terminated when the inductor current decreases to cross the valley target. Now, the valley target is zero, and the controller leaves CCM operation.

From time=$t_9$ to time=$t_{10}$, the power stage is configured have the current remain at zero. This PWL current segment is terminated once the controller determines it is time to increase the inductor current.

From time=$t_{10}$ to time=$t_{11}$, the power stage is configured to increase the inductor current by closing switch M1 and one of M3, or one of the MOut(N) switches if VOut(N) is <Vin. This PWL current segment is terminated by the expiration of a timer.

From time=$t_{11}$ to time=$t_{12}$, the power stage is configured to decrease the inductor current by closing switch one of the MOut(N) switches, and either M1 if VOut(N)>Vin or M2. This PWL current segment is terminated when the inductor current decreases to cross the valley target.

From time=$t_{12}$ to time=$t_{13}$, the power stage is configured have the current remain at zero. This PWL current segment is terminated once the controller determines it is time to increase the inductor current.

From time=$t_{13}$ to time=$t_{14}$, the power stage is configured to increase the inductor current by closing switch M1 and one of M3, or one of the MOut(N) switches if VOut(N) is <Vin. This PWL current segment is terminated by the expiration of a timer.

From time=$t_{14}$ to time=$t_{15}$, the power stage is configured to configuration where the magnitude of the inductor current slope is small closing switch M1 and of the MOut(N) switches where VOut(N) close to the value of Vin. This PWL current segment is terminated by the expiration of a timer.

From time=$t_{15}$ to time=$t_{16}$, the power stage is configured to decrease the inductor current by closing switch one of the MOut(N) switches, and either M1 if VOut(N)>Vin or M2. This PWL current segment is terminated when the inductor current decreases to cross the valley target.

FIG. 3 gives a similar example to FIG. 2 with peak current mode control rather than valley current mode control. In this example, PWL current segments that increase the inductor current are terminated when the current increases past the peak target (represented as line 302), and the other PWL current segments have their time duration determined by timers.

Another example is given in FIG. 4. In this example a peak target 402 and a valley target 404 are both used. This is referred to as Hysteretic Current Control. In this example PWL current segments that increase the inductor current are terminated by the inductor current increases beyond the peak target. PWL current segments that decrease the inductor current are terminated by the current decreasing below the valley target. PWL segments that have small magnitude of inductor current slope can have their time duration determined by a timer. Additionally, the controller can choose to switch outputs within a PWL current segments, such as is shown at $t_8$.

Control Scheme

Figure 5:
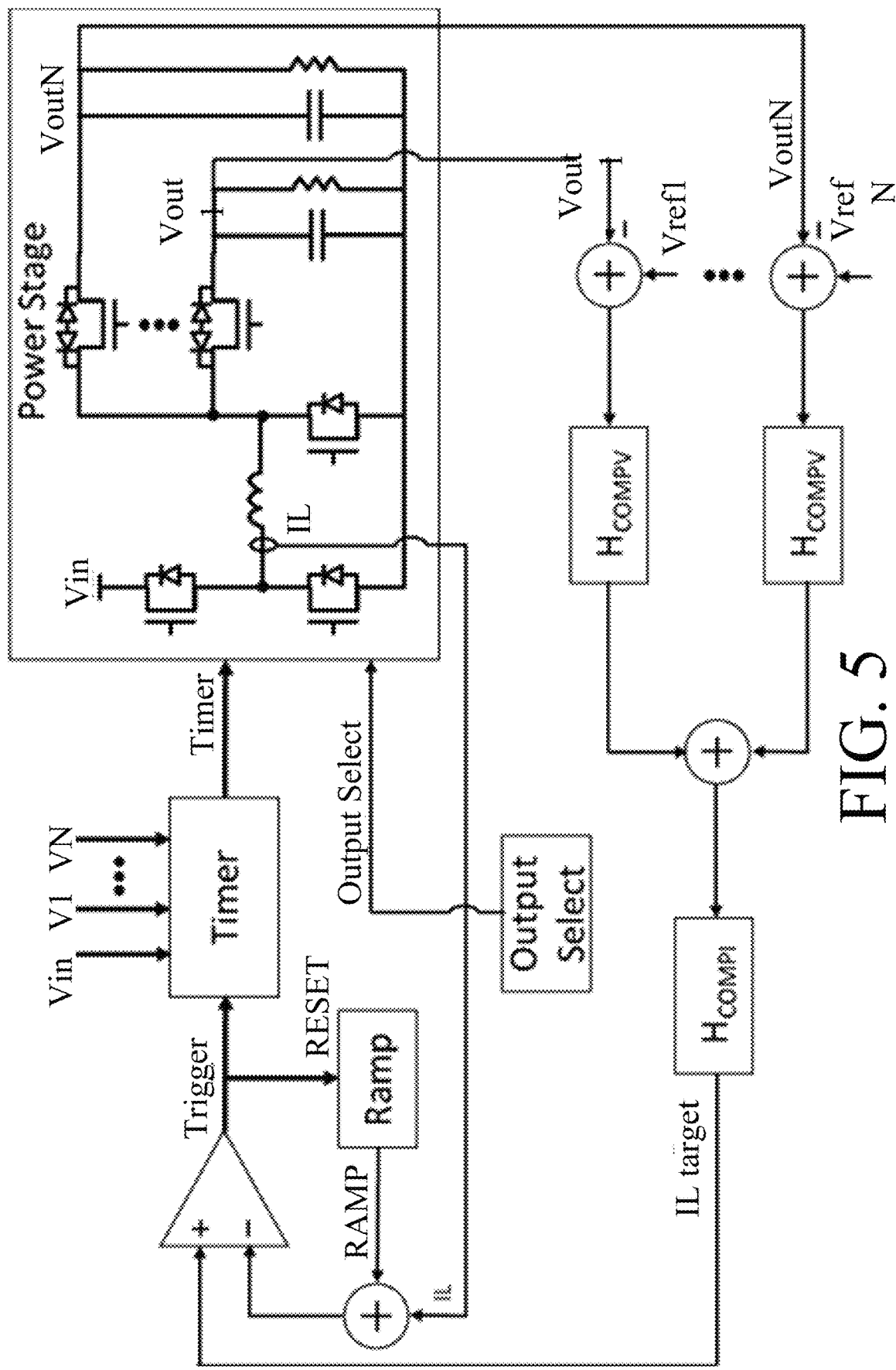
FIG. 5 is a block diagram illustrating a SIMO converter showing how the converter constructs a target current from sensed output voltages, the target current partly controlling a timer to generate the switching signals required to ramp up or ramp down inductor current and connect appropriate outputs.

FIG. 5 shows a block diagram of one implementation of the control scheme. In this controller, each output voltage is subtracted from a reference voltage to set a target regulation point for each output. These differences produce a voltage error signal for each output. These error signals are each optionally filtered by voltage compensator transfer function $H_{COMPV}$. $H_{COMPV}$ could be a gain, an integrator and zero (G·(1+sτ)/sC), or any other compensating transfer function sufficient to prevent oscillations. The compensated error signals are then summed and filtered by $H_{COMPI}$. $H_{COMPI}$ is the transfer function that sets the target inductor current for the current inner loop. $H_{COMPI}$ could be a gain, integrator and zero (G·(1+sτ)/sC), or any other suitable compensating transfer function. The target inductor current is compared with the inductor current to trigger the beginning of a new switching period. The target inductor current may be peak current, valley current, or an average current by sensing the inductor current through a transfer function. The inductor current can optionally be summed with a ramp signal in some implementations before comparing with the inductor current target. The ramp signal can be reset by the inductor current comparator. The slope of the ramp can be a function of Vin, output voltage of each output, target output voltage for each output, inductor current, target inductor current, which output is active, and/or switching frequency target.

As was demonstrated in FIGS. 2, 3, and 4, the triggering of a new switching cycle signals the timer block to generate one or more pulses of determined duration. These pulses are used by the power stage to hold the power stage switches in a configuration during the pulse durations. For example, during the pulse width, the power stage switches can be configured in a state that increases the inductor current, and after the pulse width the power stage switches can be configured in a state that decreases inductor current. In another example, there could be two consecutive pulses of determined duration generated by the timer. The first pulse width could be used to configure the power stage switches in a state that increases inductor current by connecting the inductor from Vin to Ground, and the second pulse width could be used to configure the power stage switches in a state that increases or decreases the inductor current by connecting the inductor from Vin to Vout, and after the second pulse width the power stage switches can be configured in a state that decreases inductor current. There are numerous such possible sequences and configurations and the controller is not limited to the examples given above. For example, the pulse widths may set the duration that current is decreasing rather than increasing.

The determined durations that are generated by the timer block can be a function of Vin, any of the output voltage signals, the target voltage for each output, the selection of which output is active, the inductor current, and/or the target inductor current. The pulse width duration can be determined to achieve desired goals. For example, it may be desirable to operate with pseudo constant switching frequency, and the pulse width durations can be selected to achieve this. For example, if Vin=4V, Vout=1V, the desired switching frequency is 1 MHz, and the controller is using valley current control, then the ramp-up current time can be determined with the equation 1V/4V/1 MHz=250 ns. In another example, Vin=3V, Vout=5V, the desired switching frequency is 2 MHz, and the controller is using peak current control, then the ramp-down current time can be determined with the equation 3V/5V/2 MHz=300 ns. In some embodiments it is desirable to select the pulse width durations to deliver constant charge per switching cycle independent of the inductor current. The timer duration is determined to achieve such goals by reducing the timer durations as a function of the inductor current or target inductor current.

It is not necessary that the same output be selected for all durations if there are multiple pulses generated in a single switching cycle. There are many possible schemes that the controller may use to determine which output switch MOut (N) will be active at a particular time. In one such scheme, the controller can determine which output will be active based on tracking the order in which the error magnitude of a given output becomes negative. The first output that has a negative error magnitude will receive the inductor current for at least one PWL segment of current that delivers current to that output. The output can continue to receive current until another output has negative error magnitude, at which point the controller will switch to service the next output; effectively a comparator compares the output voltage (or a fraction thereof) to a target voltage, and when the output has negative error voltage any time limit on that output is overridden to permit the inductor to service the next output. After receiving service, an output channel must get in the back of the line and cannot receive service again until all other channels with negative error have been serviced. In another scheme, the controller can judge the outputs based on their error magnitude in addition to the order in which their error became negative. In this scheme, the error magnitude of each channel can be rounded into bins. Output channels that have their error magnitude in the lowest bin have priority to receive the inductor current. Additionally, if there are multiple output channels in the lowest bin, the historical order in which they were serviced can be used to choose which output will receive service at the current time. After receiving service, a channel moves to the back of the line and not receive service again until all other channels in the error bin have been serviced.

There are many possible methods to select which output is active at a given instant. The controller described in this invention can operate the inductor current independently from the output selection scheme.

Figure 6:
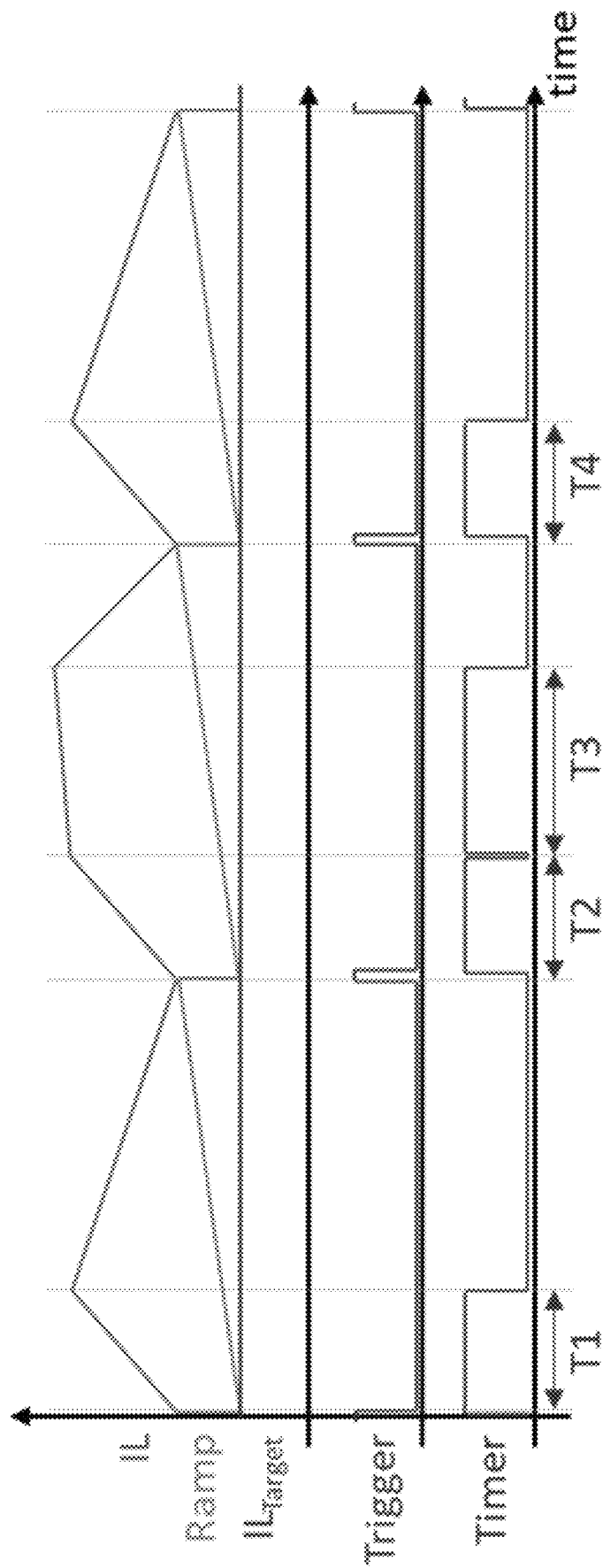
FIG. 6 is a timing diagram illustrating pseudo constant frequency operation.

The inductor current feedback used by the controller can be sensed by a sensor 130 (FIG. 1), be emulated in firmware, be estimated in firmware, or any combination of sensing, emulating, or estimation. FIG. 6 shows example waveforms of the controller operation. In this example, the first switching period begins with a timer pulse of duration T1. During this time the inductor current ramps up. After T1, the inductor current ramps down until it reaches $IL_{Target}$+Ramp. Then, the ramp is reset, and the timer is triggered again. In this example, the second switching cycle is delivering current to a different output. The second switching cycle has a sequence of two timer pulses (T2 and T3). During the first timer pulse, T2, the inductor current ramps up. In the second timer pulse, T3, the inductor current ramps up with a different slope. The slope of the inductor current could be negative during T3. After T3 the inductor current ramps down until it reaches $IL_{Target}$+Ramp. The third switching period in this example matches the first. It is not necessary that T2 and T3 be generated from the same timer circuit.

This control scheme can operate in both continuous conduction mode (CCM) and discontinuous conduction mode (DCM).

Figure 7:
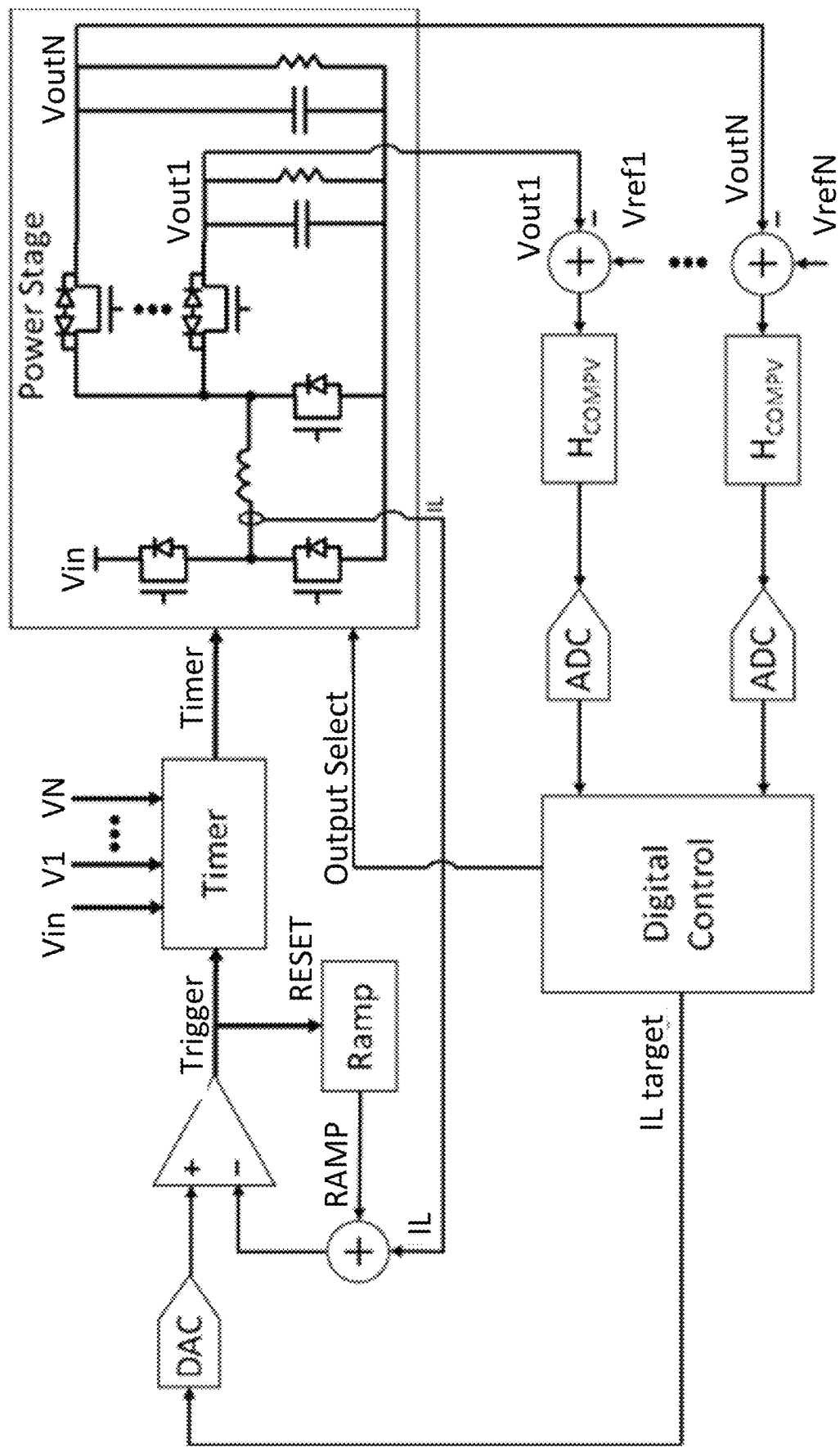
FIG. 7 is a block diagram of a SIMO converter showing control of the switches with a digital finite state machine or microcontroller.

FIG. 7 gives another example of the control scheme. In this example, the feedback network is partially implemented in digital and partially implemented in analog. The portion of the control that is implemented in digital and analog are not limited to the implementation in this example. In this example, the compensated error voltages for each output are digitized and passed to a digital controller. The quantization of the digitizers can be coarse or fine. In the coarse limit, the digitizer can be a comparator to generate a 1-bit representation indicating the output is above or below the target voltage as set from Vref. The digital controller combines the compensated error voltages to produce $IL_{Target}$. This combination of analog and digital can be implemented to functionally match the analog example in FIG. 2 by using a digital summer and compensator. The controller can also be implemented algorithmically in a digital control. An example of an algorithmic implementation is to determine the next value of $IL_{Target}$ based on the error magnitude of the currently selected output rather than summing the error signal of all outputs as was shown in FIG. 5. The digital controller can increase the target current if the digitized output of $H_{COMPV}$ for the current channel is negative, and it can decrease the target current if the digitized output of $H_{COMPV}$ for the current channel is positive. Furthermore, the magnitude of the change in target current be a function of the magnitude of the error on the channel. Some examples are adjusting the target current proportionally to the magnitude of the digitized output of $H_{COMPV}$ for the current channel or using a threshold where the current target is stepped up or down if the threshold is reached. Upon the digitized output of $H_{compv}$ exceeding the threshold, the current target may be reduced. A method for the digital controller to determine the which output to service is to map the digitized outputs of $H_{COMPV}$ for each channel into quantized bins. The output to be serviced is determined by selecting the output which has the most negative error bin and has been serviced furthest in the past among all outputs in the same error bin.

Figure 8:
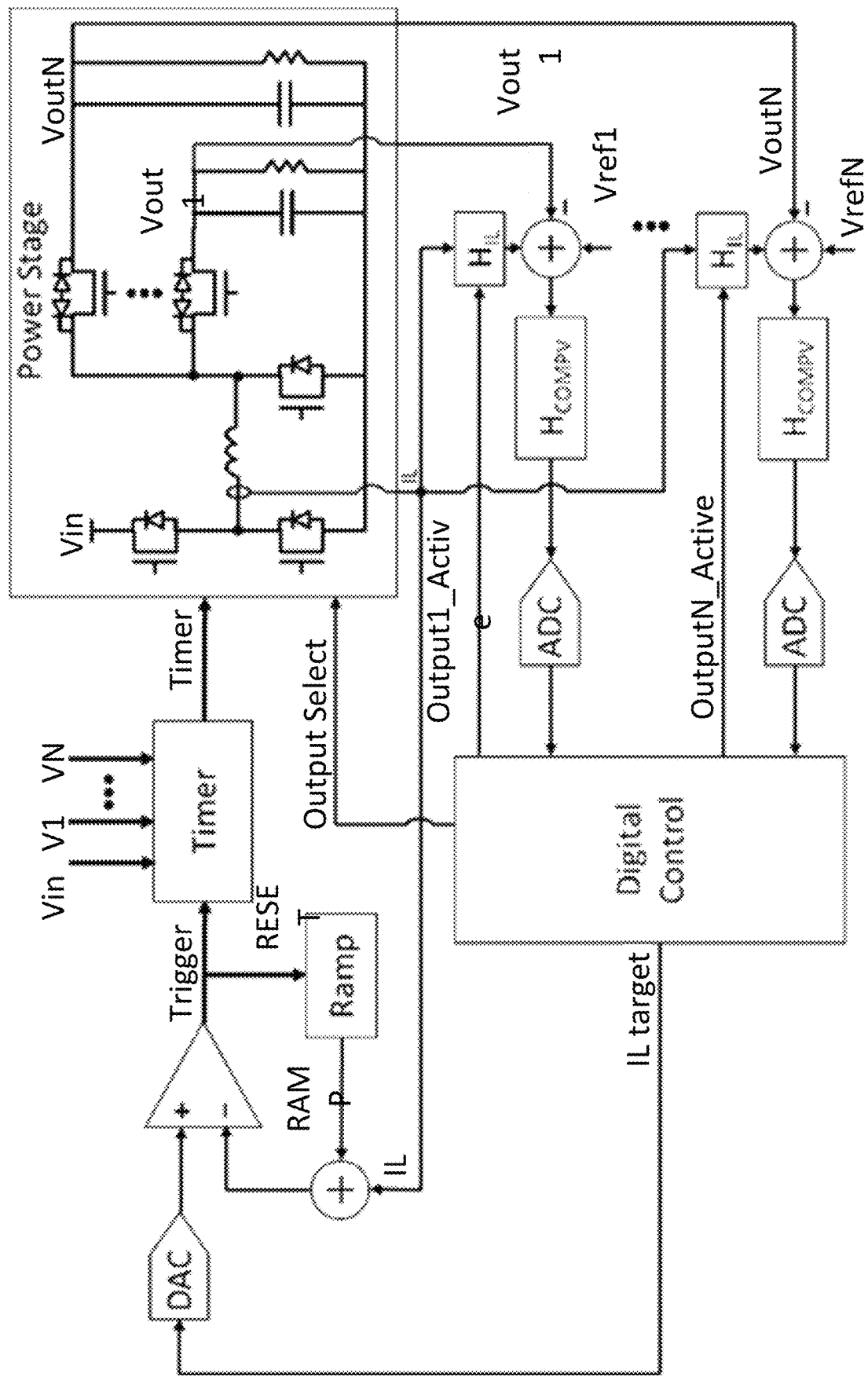
FIG. 8 is a block diagram of a SIMO converter showing a sensed inductor current being used to determine error signals in the inner current and voltage outer feedback loops.

Another example of this control scheme is given in FIG. 8. In this example, inductor current is also fed back into each of the output voltage compensators through transfer function $H_{IL}$. The inductor current signal that is fed back could be either the sensed current, an emulated current, the inductor current target or some combination. $H_{IL}$ can be a gain, low-pass filter, high-pass filter, a time-switched filter based on a timing signal from the digital controller, or any other compensating transfer function. Inclusion of this additional feedback path can be useful to increase stability margin.

Additional Features

In an embodiment, the one, two, or more outputs of the SIMO converter serve to operate a system, and one output of the SIMO converter either powers, or is configured as, a battery charger for an internal battery. In this embodiment, VIN (FIG. 1) is coupled to a primary power source, such a USB power adapter, and transistor M1 is enabled when ramping up inductor current. In this embodiment, an output, such as output 112, is coupled to charge the battery. When VIN is disconnected from the primary power source, switch M1 and MOut3 are left off while switch M1A is enabled to ramp up inductor current in place of M1.

While the switches have been illustrated as field-effect transistors, other electronic switches may be used. Further, where field-effect transistors are used, each electronic switch is designed with accessory circuitry to prevent forward biasing of source and drain junctions to substrate. Finally, in various embodiments N-channel, P-channel, and bipolar transistors may be used as the electronic switches either in the entirety, or in a combination.

In some embodiments, the SIMO converter operates in a CCM constant-charge mode where, as load current on outputs is increased, inductor current is increased. With the higher inductor current, PWL segments of the inductor current waveform applied to a high-load output VOut(1) are shortened to apply approximately the same amount of charge to that output VOut(1) during each segment, but segments are applied to that output VOut(1) at a much higher rate. This embodiment has advantage of increasing ripple frequency but reducing ripple voltage on VOut(1)

below what ripple voltage would be if segments of variable charge were applied to that output at a lower, nearly constant, rate.

In embodiments, the current sensor 130 (FIG. 1) may directly measure inductor current to provide a signal indicative of inductor current to the controller 114, and in other embodiments an estimate of inductor current may be provided as the signal indicative of current in the inductor to controller 114.

In embodiments, the inductor current target is determined by the controller based upon both the current cycle error voltages at each output, prior cycle inductor current target, and prior cycle error voltages at each output. Where a prior cycle inductor current target was insufficient to maintain output voltages at desired levels, the inductor current target is increased, and similarly where a prior cycle inductor current target was excessive as determined by output voltages above target voltages, the inductor current target may be decreased.

Changes may be made in the above methods and systems without departing from the scope hereof. It should thus be noted that the matter contained in the above description or shown in the accompanying drawings should be interpreted as illustrative and not in a limiting sense. The following claims are intended to cover all generic and specific features described herein, as well as all statements of the scope of the present method and system, which, as a matter of language, might be said to fall therebetween.

What is claimed is:

1. A controller for a single-inductor multiple output (SIMO) DC-DC converter operable in continuous-conduction mode (CCM) comprising:
   a first input adapted to receive a signal representative of inductor current,
   a plurality of second inputs each adapted to receive a signal representative of a state of an output of the SIMO DC-DC converter,
   first outputs adapted to control an electronic switch network to connect a first inductor terminal to a selected SIMO input port or ground,
   second outputs adapted to control the electronic switch network to connect a second inductor terminal to a selected SIMO output port or ground,
   where the controller is configured to determine inductor current targets where a local minimum of the inductor current targets is a non-zero inductor current target for at least some conditions;
   where the first output and second outputs are configured to control the electronic switch network in a sequence of cycles comprising a plurality of electronic switch network configurations, where a cycle begins and ends with the inductor current equal to at least one inductor current target of the inductor current targets, and where a duration of at least one electronic switch network configuration in the cycle is a predetermined time interval.

2. The controller of claim 1 wherein the non-zero inductor current target is determined to be sufficient to maintain voltages at the SIMO output ports at determined regulation setpoints.

3. The controller of claim 2 wherein the controller is configured to also be operable with the SIMO DC-DC converter in discontinuous conduction mode (DCM).

4. The controller of claim 2 wherein the duration of at least one of the plurality of electronic switch network configurations is terminated by expiration of a predetermined time interval and may be overridden by an input selected from the second inputs.

5. The controller of claim 2 wherein the duration of at least one electronic switch network configuration is terminated by expiration of a predetermined time interval and may be overridden by the first input indicating inductor current reaching an inductor current target selected from the inductor current targets.

6. A SIMO DC-DC converter comprising:
   the controller of claim 1;
   a first and a second output filter, the first output filter coupled to a first output of the SIMO DC-DC converter and the second output filter coupled to a second output of the SIMO DC-DC converter;
   the electronic switch network comprising a first electronic switch coupled to an input of the DC-DC converter;
   an inductor coupled to the first electronic switch, a second electronic switch of the electronic switch network, and a third electronic switch of the electronic switch network, the second electronic switch coupled to the first output filter, and the third electronic switch is coupled to the second output filter;
   a fourth and fifth electronic switches of the electronic switch network coupled to the inductor and adapted to control current in the inductor;
   the controller configured to control the first, second, third, and fourth electronic switch;
   apparatus configured to provide a signal representative of current in the inductor to the first input of the controller; and
   where the second inputs of the controller are coupled to the first and second outputs of the SIMO DC-DC converter.

7. The SIMO DC-DC converter of claim 6 further comprising a sixth switch connected to a third output filter.

8. The SIMO DC-DC converter of claim 7 wherein a voltage at each output filter is used to terminate a configuration in a cycle.

9. The SIMO DC-DC converter of claim 6 wherein the controller is capable of operating the SIMO DC-DC converter in discontinuous conduction mode (DCM).

10. The SIMO DC-DC converter of claim 9 wherein the controller is capable of operating the SIMO DC-DC converter in continuous conduction mode (CCM).

11. A method of controlling a single-inductor multiple output (SIMO) DC-DC converter comprising:
   time sharing an inductor between each output of the SIMO DC-DC converter, and ground;
   setting an inductor current target based on measurement of each output of the SIMO DC-DC converter;
   cyclically coupling a first end of the inductor to at least one of the outputs, or a ground such that the inductor current is equal to an inductor current target at the beginning and end of a cycle; the duration of at least one of the couplings is a predetermined time interval; and coupling the inductor in a sequence delivering a fraction of inductor current to each of the SIMO DC-DC converter outputs to satisfy the load on each output.

12. The method of claim 11 further comprising connecting the inductor to an input port as part of its sequence of couplings within a cycle.

13. The method of claim 11 wherein the inductor current target at the end of a cycle is greater than zero when the SIMO DC-DC converter is heavily loaded, and is zero when the SIMO DC-DC converter is lightly loaded.

* * * * *